(12) United States Patent
Kwon et al.

(10) Patent No.: US 10,291,340 B2
(45) Date of Patent: May 14, 2019

(54) REPEATER AND SIGNAL ATTENUATION METHOD THEREOF

(71) Applicant: SOLiD, INC., Seongnam-si, Gyeonggi-do (KR)

(72) Inventors: Nagwon Kwon, Seoul (KR); Hyunchae Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/916,910

(22) Filed: Mar. 9, 2018

(65) Prior Publication Data

US 2018/0198540 A1  Jul. 12, 2018

Related U.S. Application Data

(63) Continuation of application No. 15/395,240, filed on Dec. 30, 2016, now Pat. No. 9,954,629.

(30) Foreign Application Priority Data

Dec. 31, 2015  (KR) .................. 10-2015-0190842

(51) Int. Cl.

| | |
|---|---|
| *H04B 17/40* | (2015.01) |
| *H04B 7/155* | (2006.01) |
| *H04W 52/24* | (2009.01) |
| *H04W 52/46* | (2009.01) |
| *H04B 17/309* | (2015.01) |

(52) U.S. Cl.
CPC ............. *H04B 17/40* (2015.01); *H04B 7/155* (2013.01); *H04B 17/309* (2015.01); *H04W 52/246* (2013.01); *H04W 52/46* (2013.01)

(58) Field of Classification Search
CPC ....... H04B 17/40; H04B 17/309; H04B 7/155
See application file for complete search history.

(56) References Cited

U.S. PATENT DOCUMENTS

| | | |
|---|---|---|
| 4,191,995 A | 3/1980 | Farrow |
| 2005/0163268 A1 | 7/2005 | McCallister |
| 2015/0097623 A1 | 4/2015 | Staudinger et al. |
| 2015/0256372 A1* | 9/2015 | Sidiropoulos ........ H03G 3/3078 375/340 |
| 2016/0028482 A1 | 1/2016 | Bujanos et al. |
| 2018/0019774 A1* | 1/2018 | Hampel ............ H04L 25/03006 |

FOREIGN PATENT DOCUMENTS

EP  0547832 A1  6/1993

* cited by examiner

*Primary Examiner* — Jaison Joseph
(74) *Attorney, Agent, or Firm* — Sughrue Mion, PLLC

(57) ABSTRACT

A repeater including an analog attenuator configured to attenuate an analog signal in response to a first control signal; an analog to digital converter (ADC) configured to convert the attenuated analog signal into a digital signal; a digital attenuator configured to attenuate the digital signal in response to a second control signal; and an attenuation controller configured to calculate average power and peak power of the attenuated digital signal, determine an attenuation value for each value of the calculated average power and peak power, and generate at least one of the first and second control signals based on the determined attenuation values.

16 Claims, 5 Drawing Sheets

REPEATER AND SIGNAL ATTENUATION METHOD THEREOF

CROSS-REFERENCE TO RELATED APPLICATION

This application is a continuation of U.S. patent application Ser. No. 15/395,240 filed Dec. 30, 2016 in the U.S. Patent and Trademark Office, which claims the benefit of Korean Patent Application No. 10-2015-0190842, filed on Dec. 31, 2015, in the Korean Intellectual Property Office, the disclosure of which is incorporated herein in its entirety by reference.

BACKGROUND

1. Field

The inventive concept relates to a method of attenuating signals of a repeater, and more particularly, to a repeater for preventing excessive power of signals input to the repeater, and a method of attenuating signals of the same.

2. Description of the Related Art

A wireless communication system may include a repeater, a base station, and a communication device. The base station and the communication device may transmit and receive signals each other. The communication device is an electronic device capable of wireless communication such as a mobile phone, a smart phone, or a tablet PC. The repeater may be used when signals between the base station and the communication device are not sufficient to allow voice or data communication. The repeater may be an electronic device that receives signals and retransmits the signals at a higher level or higher power. The repeater may receive signals output from the base station and retransmit the signals to the communication device at a higher level or higher power.

However, the repeater may not operate properly due to excessive power of signals received through an antenna of the repeater. Therefore, methods of attenuating signals to prevent excessive power of the signals are required.

SUMMARY

The inventive concept is directed to a method and a repeater for attenuating signals to prevent excessive power of the signals transmitted to the repeater.

Additional aspects will be set forth in part in the description which follows and, in part, will be apparent from the description, or may be learned by practice of the presented example embodiments.

According to an aspect of the inventive concept, there is provided a repeater, the repeater includes: an analog attenuator configured to attenuate an analog signal in response to a first control signal; an analog to digital converter (ADC) configured to convert the attenuated analog signal into a digital signal; a digital attenuator configured to attenuate the digital signal in response to a second control signal; and an attenuation controller configured to calculate average power and peak power of the attenuated digital signal, determine an attenuation value for each value of the calculated average power and peak power, and generate at least one of the first and second control signals based on the determined attenuation values.

According to an exemplary embodiment, wherein the attenuation controller may be configured to calculate the average power of the attenuated digital signal by a root means square (RMS) value.

According to an exemplary embodiment, wherein the attenuation controller may be configured to calculate the peak power of the attenuated digital signal in at least one of a time domain and a frequency domain.

According to an exemplary embodiment, wherein the attenuation controller may be configured to compare each of the average power value and the peak power value with at least one corresponding threshold value, and determine an attenuation value for each of the average power value and the peak power value according to the comparison result.

According to an exemplary embodiment, wherein the attenuation controller may be configured to compare magnitudes of the determined attenuation values and generate at least one of the first and second control signals according to the largest value of the determined attenuation values.

According to an exemplary embodiment, wherein the attenuation controller may be configured to compare magnitudes of the determined attenuation values and generate at least one of the first and second control signals according to the attenuation value for the average power value if the determined attenuation values are substantially equal in magnitude.

According to an exemplary embodiment, wherein the attenuation controller may include: an average power calculator configured to calculate the average power of the attenuated digital signal; a first peak power calculator configured to calculate peak power in a time domain of the attenuated digital signal; a second peak power calculator configured to calculate peak power in a frequency domain of the attenuated digital signal; a first comparator configured to compare a value of the calculated average power with at least one of first threshold values to output a first comparison signal; a second comparator configured to compare a value of the calculated peak power in the time domain with at least one of second threshold values to output a second comparison signal; a third comparator configured to compare a value of the calculated peak power in the frequency domain with at least one of third threshold values to output a third comparison signal; and a control signal generator configured to determine first to third attenuation values corresponding to the first to third comparison signals, and generate the first and second control signals based on the first to third attenuation values.

According to an exemplary embodiment, wherein an attenuation range of the analog attenuator may be greater than that of the digital attenuator.

According to another aspect of the inventive concept, there is provided a repeater, the repeater includes: an analog attenuator configured to attenuate an analog signal in response to a first control signal; an analog to digital converter (ADC) configured to convert the attenuated analog signal into a digital signal; a digital attenuator configured to attenuate the digital signal in response to a second control signal; and an attenuation controller configured to calculate power of the attenuated digital signal in a time domain and a frequency domain, determine an attenuation value for each value of the power calculated in the time domain and the frequency domain, and generate at least one of the first and second control signals based on the determined attenuation values.

According to an exemplary embodiment, wherein the attenuation controller may be configured to calculate the power of the attenuated digital signal in the time domain by a root means square (RMS) value and a peak value.

According to an exemplary embodiment, wherein the attenuation controller may be configured to calculate the power of the attenuated digital signal in the frequency domain by a peak value.

According to yet another aspect of the inventive concept, there is provided a method of attenuating signals of a repeater, the method includes: attenuating an analog signal in response to a first control signal; converting the attenuated analog signal into a digital signal; attenuating the digital signal in response to a second control signal; calculating average power and peak power of the attenuated digital signal; determining an attenuation value for each value of the calculated average power and peak power; and generating at least one of the first and second control signals based on the determined attenuation values.

According to the inventive concept, a repeater may attenuate an input signal efficiently by calculating peak power in addition to average power of the signal and using the calculation to attenuate the signal.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
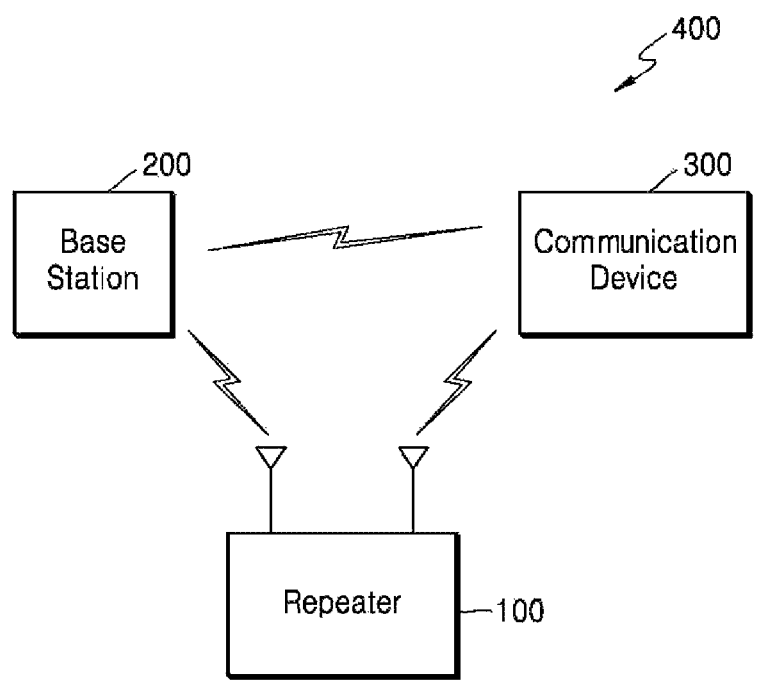
FIG. 1 is a block diagram of a wireless communication system according to an example embodiment of the inventive concept.

The inventive concept may be variously modified and have various example embodiments, so that specific example embodiments will be illustrated in the drawings and described in the detailed description. However, this does not limit the inventive concept to specific example embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, example embodiments of the inventive concept will be described in detail.

FIG. 1 is a block diagram of a wireless communication system 400 according to an example embodiment of the inventive concept.

Referring to FIG. 1, the wireless communication system 400 may include a frequency division duplexing (FDD) network, a frequency division multiple access (FDMA) network, an orthogonal FDMA (OFDMA) network, a code division multiple access (CDMA) network, a time division multiple access (TDMA) network, a direct sequence spread spectrum (DSSS) network, a frequency hopping spread spectrum (FHSS) network, or some other wireless communication networks. In some example embodiments, the wireless communication system 400 may be configured to operate as a second generation (2G) wireless communication network, a third generation (3G) wireless communication network, a fourth generation (4G) wireless communication network, or a long-term evolution (LTE) wireless communication network.

The wireless communication system 400 may include a repeater 100, a base station 200, and a communication device 300.

The base station 200 and the communication device 300 may transmit and receive signals each other. The communication device 300 is an electronic device capable of wireless communication such as a mobile phone, a smart phone, or a tablet PC. The repeater 100 may be used when signals between the base station 200 and the communication device 300 are not sufficient to allow voice or data communication.

The repeater 100 may receive signals output from the base station 200 and retransmit the signals to the communication device 300 at a higher level or higher power. According to an example embodiment, the repeater 100 may be referred to as a wireless repeater. Here, the wireless repeater 100 may be understood to include an interference cancellation repeater capable of canceling an interference signal generated by re-inputting a signal transmitted from a transmitting antenna to a receiving antenna via a feedback channel.

Figure 2:
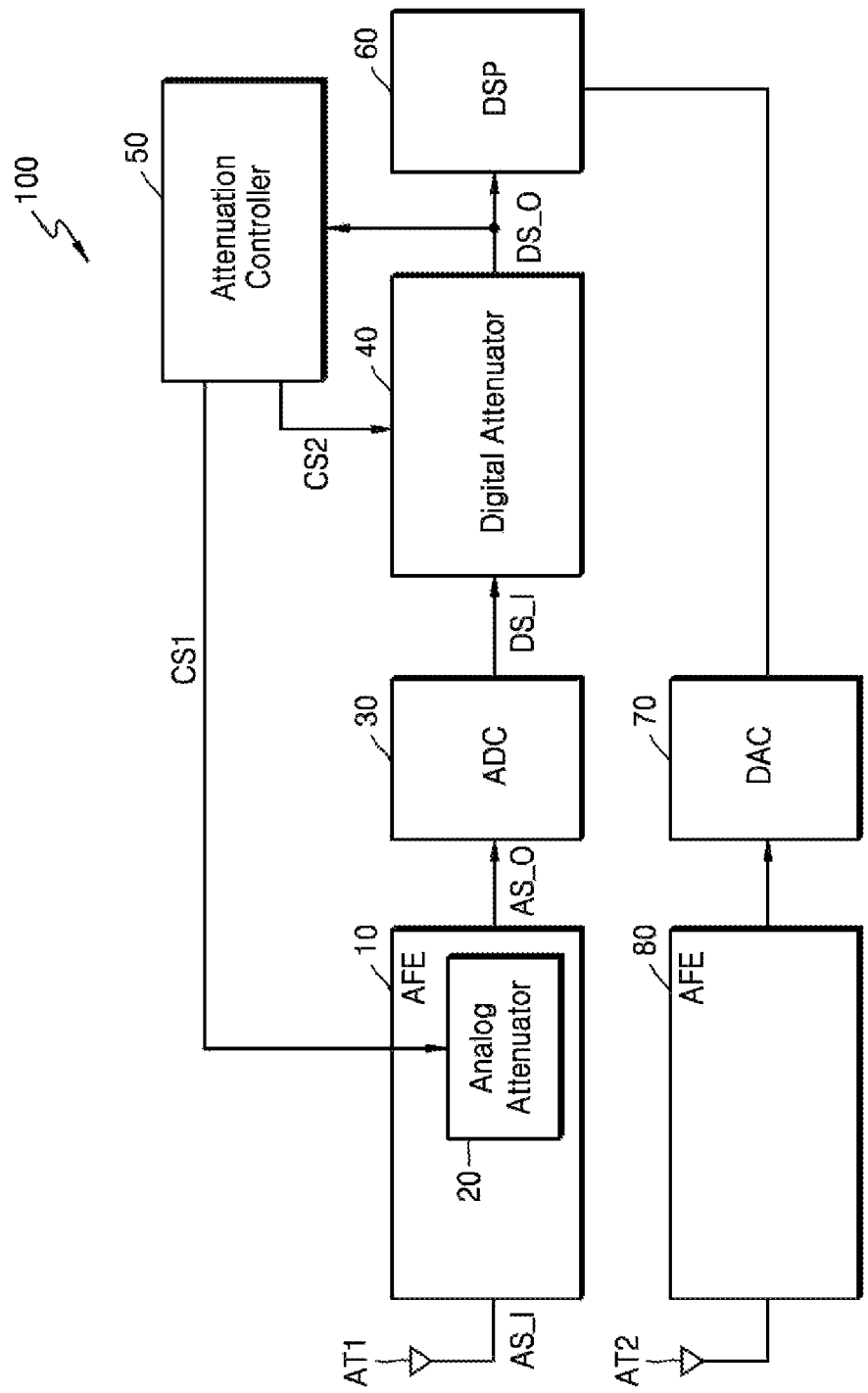
FIG. 2 is a block diagram of a repeater shown in FIG. 1.

FIG. 2 is a block diagram of the repeater 100 shown in FIG. 1.

Referring to FIGS. 1 and 2, the repeater 100 may include a first antenna AT1, a first analog front end (AFE) 10, an analog to digital converter (ADC) 30, a digital attenuator 40, an attenuation controller 50, a digital signal processor (DSP)

60, a digital to analog converter (DAC) 70, a second AFE 80, and a second antenna AT2. According to an example embodiment, the repeater 100 may be implemented variously using different components.

The first antenna AT1 receives signals transmitted from the base station 200. According to an example embodiment, the first antenna AT1 may receive signals transmitted from the communication device 300. The second antenna AT2 transmits signals to the communication device 300. The second antenna AT2 may transmit signals to the base station 200 according to an example embodiment.

The first and second AFEs 10 and 80 are a set of analog components for performing receiving and transmitting functions of the repeater 100. Each of the first and second AFEs 10 and 80 may include a variable gain amplifier (VGA) (not shown), a power amplifier (PA) (not shown), a filter (not shown), a mixer (not shown), or a driver (not shown). The first AFE 10 processes an analog signal received via the first antenna AT1 using a component such as a filter to perform a receiving function, and outputs the processed analog signal.

The first AFE 10 includes an analog attenuator 20. The analog attenuator 20 may be implemented before or after another component (e.g., the filter (not shown), or the mixer (not shown)). An implemented position of the analog attenuator 20 may vary according to an example embodiment. The analog attenuator 20 attenuates an analog signal AS_I in response to a first control signal CS1 and outputs an attenuated analog signal AS_O. The analog signal AS_I refers to a signal received via the first antenna AT1 and a signal before being input to the ADC 30. For example, the analog signal AS_I may be a signal received via the first antenna AT1 or a signal (e.g., a filtered signal) after an operation (filtering) is performed by at least one (e.g., the filter (not show)) of the plurality of analog components implemented in the first AFE 10.

Figure 3:
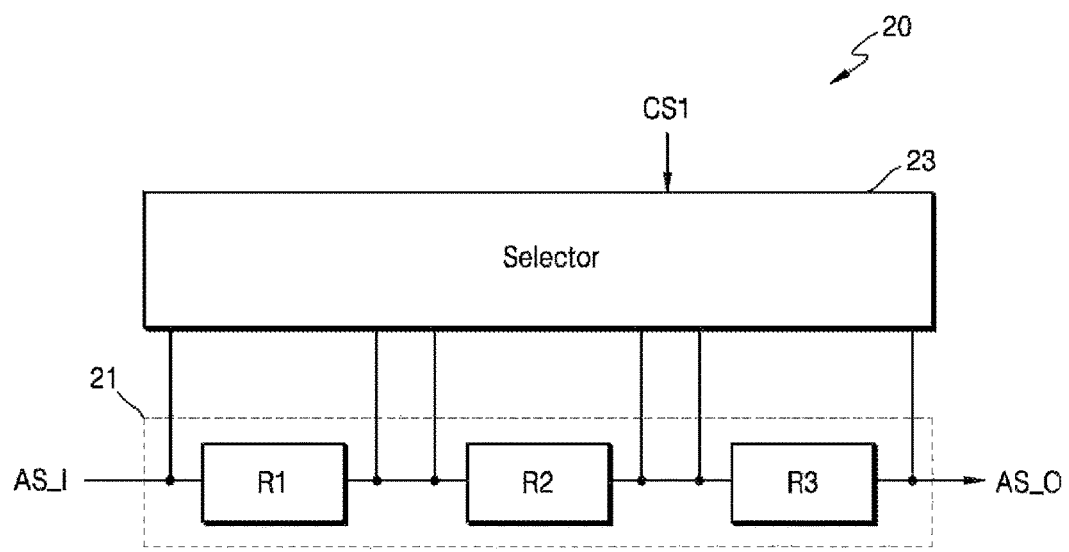
FIG. 3 is a block diagram of an example embodiment of an analog attenuator shown in FIG. 2.

FIG. 3 is a block diagram of an example embodiment of the analog attenuator 20 shown in FIG. 2.

Referring to FIGS. 1 through 3, the analog attenuator 20 may include a resistor array 21 and a selector 23.

The resistor array 21 includes resistors having different resistance values R1, R2, and R3. Structures of the resistors may vary according to an example embodiment.

The selector 23 may select the resistance value R1, R2, or R3 in the resistance array 21 in response to the first control signal CS1. An attenuation value is determined according to the selected resistance value R1, R2, or R3. The first control signal CS1 may be a plurality of analog voltages.

For example, an attenuation range of the analog attenuator 20 may be 0 dB to 32 dB. Also, the selector 23 may not select the resistance value R1, R2, or R3 in response to the first control signal CS1. When the selector 23 does not select the resistance value R1, R2, or R3, an attenuation value may be 0 dB. Here, analog voltages of the first control signal CS1 may be 0V, 0V, and 0V, respectively.

When the selector 23 selects a first resistance value R1, an attenuation value may be 8 dB. Here, analog voltages of the first control signal CS1 may be 5V, 0V, and 0V, respectively.

When the selector 23 selects a second resistance value R2, an attenuation value may be 16 dB. Here, analog voltages of the first control signal CS1 may be 0V, 5V, and 0V, respectively.

When the selector 23 selects a third resistance value R3, an attenuation value may be 32 dB. Here, analog voltages of the first control signal CS1 may be 0V, 0V, and 5V, respectively.

An attenuation value according to a selection of an attenuation range and a resistance value of the analog attenuator 20 may vary according to an example embodiment. The selector 23 may be implemented by analog components such as a combination of a transistor (not shown) and a resistor (not shown).

Referring again to FIG. 2, the ADC 30 converts the analog signal AS_O attenuated by the analog attenuator 20 into a digital signal DS_I.

The digital attenuator 40 attenuates the digital signal DS_I in response to a second control signal CS2 and outputs an attenuated digital signal DS_O. For example, an attenuation range of the digital attenuator 40 may be 0 dB to 4 dB.

An attenuation value attenuable by the analog attenuator 20 is greater than an attenuation value attenuable by the digital attenuator 40. For example, when an attenuation value attenuable by the analog attenuator 20 is 8 dB, 16 dB, or 32 dB, an attenuation value attenuable by the digital attenuator 40 may be 1 dB, 2 dB, or 4 dB. The analog signal AS_I is attenuated approximately by the analog attenuator 20 and the digital signal DS_I is attenuated minutely by the digital attenuator 40 so that an efficient attenuation operation of a signal may be performed.

The digital attenuator 40 may be implemented by hardware such as a logic gate or by software such as a program code. The digital attenuator 40 may be implemented by one separate chip. The digital attenuator 40 may be implemented as a part of the DSP 60 according to an example embodiment.

Figure 4:
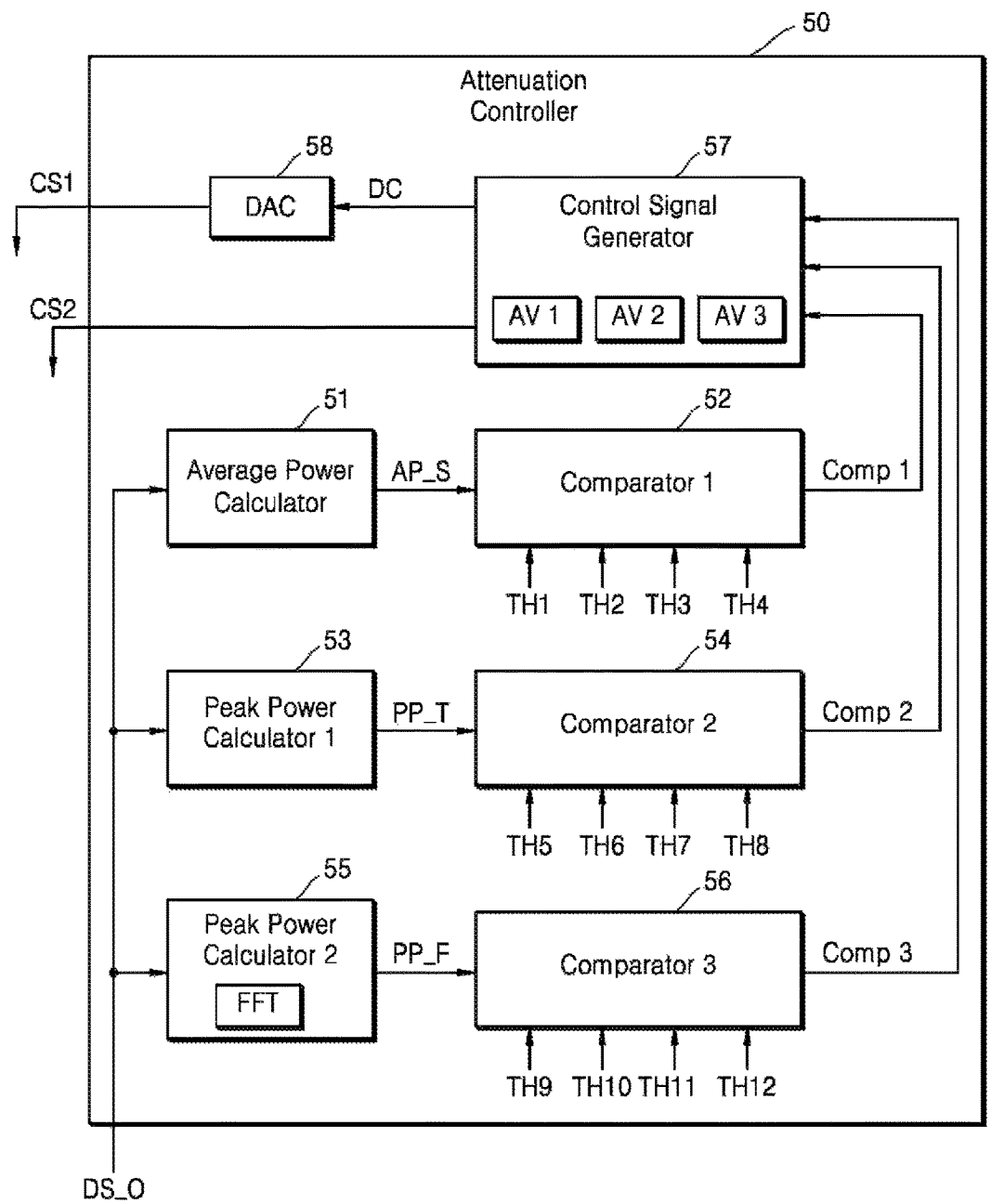
FIG. 4 is a block diagram of an example embodiment of an attenuation controller shown in FIG. 2.

FIG. 4 is a block diagram of an example embodiment of the attenuation controller 50 shown in FIG. 2.

Referring to FIGS. 1 through 4, the attenuation controller 50 calculates power of the attenuated digital signal DS_O and generates at least one of the first and second control signals CS1 and CS2 according to the calculated power.

According to an embodiment, the attenuation controller 50 calculates average power and peak power of the attenuated digital signal DS_O, determines an attenuation value for each of the calculated average power and peak power, and generates at least one of the first and second control signals CS1 and CS2 based on the determined attenuation values. Here, the attenuation controller 50 may calculate the peak power of the attenuated digital signal DS_O in a time domain and/or a frequency domain.

Hereinafter, for convenience of explanation, an example embodiment in which the attenuation controller 50 calculates the peak power of the attenuated digital signal DS_O in both a time domain and a frequency domain and uses the calculation result to generate the first and second control signals CS1 and CS2 will be mainly described.

In more detail, the attenuation controller 50 calculates average power, peak power in a time domain, and peak power in a frequency domain, respectively. The attenuation controller 50 compares a value AP_S of the calculated average power, a value PP_T of the calculated peak power in the time domain, and a value PP_F of the calculated peak power in the frequency domain with at least one of a first plurality of threshold values TH1, TH2, TH3, and TH4, at least one of a second plurality of threshold values TH5, TH6, TH7, and TH8, and at least one of a third plurality of threshold values TH9, TH10, TH11, and TH12, respectively, and determines a plurality of attenuation values AV1, AV2, and AV3 of the attenuated digital signal DS_O according to the comparison result. The attenuation controller 50 generates the first and second control signals CS1 and CS2 according to the largest value of the determined attenuation values AV1, AV2 and AV3.

The attenuation controller 50 may include an average power calculator 51, a first comparator 52, a first peak power calculator 53, a second comparator 54, a second peak power calculator 55, a third comparator 56, a control signal generator 57, and a DAC 58. Components of each of the average power calculator 51, the first comparator 52, the first peak power calculator 53, the second comparator 54, the second peak power calculator 55, the third comparator 56, the control signal generator 57, and the DAC 58 may be implemented by hardware such as a logic gate or with software such as a program code. The attenuation controller 50 may be implemented by one separate chip or may be implemented by a single chip with the digital attenuator 40. The attenuation controller 50 may be implemented as a part of the DSP 60 according to an example embodiment.

The average power calculator 51 may calculate average power of the attenuated digital signal DS_O. Power of the digital signal DS_O may be calculated by a root means square (RMS) value. The RMS value may be calculated in a time domain.

The first comparator 52 compares the calculated average power value AP_S with at least one of the first plurality of threshold values TH1, TH2, TH3, and TH4 to output a first comparison signal COMP1. The number of threshold values used in the first comparator 52 is assumed to be four in the inventive concept, but is not limited thereto.

The first comparator 52 compares the calculated average power value AP_S with the first plurality of threshold values TH1, TH2, TH3, and TH4 to output the first comparison signal COMP1. The second threshold value TH2 may be greater than the first threshold value TH1, the third threshold value TH3 may be greater than the second threshold value TH2, and the third threshold value TH3 may be greater than the fourth threshold value TH4. The first comparison signal COMP1 may be composed of 4 bits. According to an example embodiment, the number of the first plurality of threshold values TH1, TH2, TH3, and TH4 or the number of bits of the first comparison signal COMP1 may vary.

For example, when the calculated average power value AP_S is less than the first threshold value TH1, bit values of the first comparison signal COMP1 may be 'H(high)', 'H(high)', 'H(high)', and 'H(high)', respectively.

When the calculated average power value AP_S is greater than the first threshold value TH1 and less than the second threshold value TH2, bit values of the first comparison signal COMP1 may be 'L(low)', 'H(high)', 'H(high)', and 'H(high)', respectively.

When the calculated average power value AP_S is greater than the first threshold value TH1 and the second threshold value TH2 and less than the third threshold value TH3, bit values of the first comparison signal COMP1 may be 'L(low)', 'L(low)', 'H(high)', and 'H(high)', respectively.

When the calculated average power value AP_S is greater than the first threshold value TH1, the second threshold value TH2, and the third threshold value TH3 and less than the fourth threshold value TH4, bit values of the first comparison signal COMP1 may be 'L(low)', 'L(low)', 'L(low)', and 'H(high)', respectively.

When the calculated average power value AP_S is greater than the first threshold value TH1, the second threshold value TH2, the third threshold value TH3, and the fourth threshold value TH4, bit values of the first comparison signal COMP1 may be 'L(low)', 'L(low)', 'L(low)', and 'L(low)', respectively.

The first peak power calculator 53 may calculate the peak power of the attenuated digital signal DS_O. The first peak power calculator 530 may calculate peak power in a time domain of the digital signal DS_O.

The second comparator 54 compares the calculated peak power value PP_T with at least one of the second plurality of threshold values TH5, TH6, TH7, and TH8 to output a second comparison signal COMP2. The number of threshold values used in the second comparator 54 is assumed to be four in the inventive concept, but is not limited thereto.

That is, the second comparator 54 compares the calculated peak power value PP_T with the second plurality of threshold values TH5, TH6, TH7, and TH8 to output the second comparison signal COMP2. The sixth threshold value TH6 may be greater than the fifth threshold value TH5, the seventh threshold value TH7 may be greater than the sixth threshold value TH6, and the eighth threshold value TH8 may be greater than the seventh threshold value TH7. The second comparison signal COMP2 may be composed of 4 bits. According to an example embodiment, the number of the second plurality of threshold values TH5, TH6, TH7, and TH8 or the number of bits of the second comparison signal COMP2 may vary. Furthermore, according to an example embodiment, the second plurality of threshold values TH5, TH6, TH7, and TH8 may be equal to the first plurality of threshold values TH1, TH2, TH3, and TH4.

For example, when the calculated peak power value PP_T is less than the fifth threshold value TH5, bit values of the second comparison signal COMP2 may be 'H(high)', 'H(high)', 'H(high)', and 'H(high)', respectively.

When the calculated peak power value PP_T is greater than the fifth threshold value TH5 and less than the sixth threshold value TH6, bit values of the second comparison signal COMP2 may be 'L(low)', 'H(high)', 'H(high)', and 'H(high)', respectively.

When the calculated peak power value PP_T is greater than the fifth threshold value TH5 and the sixth threshold value TH6 and less than the seventh threshold value TH7, bit values of the second comparison signal COMP2 may be 'L(low)', 'L(low)', 'H(high)', and 'H(high)', respectively.

When the calculated peak power value PP_T is greater than the fifth threshold value TH5, the sixth threshold value TH6, and the seventh threshold value TH7 and less than the eighth threshold value TH8, bit values of the second comparison signal COMP2 may be 'L(low)', 'L(low)', 'L(low)', and 'H(high)', respectively.

When the calculated peak power value PP_T is greater than the fifth threshold value TH5, the sixth threshold value TH6, the seventh threshold value TH7, and the eighth threshold value TH8, bit values of the second comparison signal COMP2 may be 'L(low)', 'L(low)', 'L(low)', and 'L(low)', respectively.

The second peak power calculator 55 calculates peak power in a frequency domain of the attenuated digital signal DS_O. The second peak power calculator 55 may include a Fast Fourier Transform (FFT) converter to convert a time domain of the attenuated digital signal DS_O into a frequency domain. The second peak power calculator 55 converts the attenuated digital signal DS_O from a time domain to a frequency domain and calculates the peak power in the frequency domain.

The third comparator 56 compares the calculated peak power value PP_F in the frequency domain with at least one of the third plurality of threshold values TH9, TH10, TH11, and TH12 to generate a third comparison signal COMP3. The number of threshold values used in the third comparator 56 is assumed to be four in the inventive concept, but is not limited thereto.

That is, the third comparator 56 compares the calculated peak power value PP_F in the frequency domain with the third plurality of threshold values TH9, TH10, TH11, and TH12 to generate the third comparison signal COMP3. The tenth threshold value TH10 may be greater than the ninth threshold value TH9, the eleventh threshold value TH11 may be greater than the tenth threshold value TH10, and the twelfth threshold value TH12 may be greater than the eleventh threshold value TH11. The third comparison signal COMP3 may be composed of 4 bits. According to an example embodiment, the number of the third plurality of threshold values TH9, TH10, TH11, and TH12 or the number of bits of the third comparison signal COMP may vary.

For example, when the calculated peak power value PP_F in the frequency domain is less than the ninth threshold value TH9, bit values of the third comparison signal COMP3 may be 'H(high)', 'H(high)', 'H(high)', and 'H(high)', respectively.

When the calculated peak power value PP_F in the frequency domain is greater than the ninth threshold value TH9 and less than the tenth threshold value TH10, bit values of the third comparison signal COMP3 may be 'L(low)', 'H(high)', 'H(high)', and 'H(high)', respectively.

When the calculated peak power value PP_F in the frequency domain is greater than the ninth threshold value TH9 and the tenth threshold value TH10 and less than the eleventh threshold value TH11, bit values of the third comparison signal COMP3 may be 'L(low)', 'H(high)', 'H(high)', and 'H(high)', respectively.

When the calculated peak power value PP_F in the frequency domain is greater than the ninth threshold value TH9, the tenth threshold value TH10, and the eleventh threshold value TH11 and less than the twelfth threshold value TH12, bit values of the third comparison signal COMP3 may be 'L(low)', 'L(low)', 'L(low)', and 'H(high)', respectively.

When the calculated peak power value PP_F in the frequency domain is greater than the ninth threshold value TH9, the tenth threshold value TH10, the eleventh threshold value TH11, and the twelfth threshold value TH12, bit values of the third comparison signal COMP3 may be 'L(low)', 'L(low)', 'L(low)', and 'L(low)', respectively.

The control signal generator 57 determines a first attenuation value AV1 according to the first comparison signal COMP1, determines a second attenuation value AV2 according to the second comparison signal COMP2, and determines a third attenuation value AV3 according to the signal COMP3.

For example, when bit values of the first comparison signal COMP1 are 'H(high)', 'H(high)', 'H(high)', and 'H(high)', respectively, the control signal generator 57 may determine the first attenuation value AV1 to be 0 dB. Similarly, when bit values of the second comparison signal COMP2 or the third comparison signal COMP3 are 'H(high)', 'H(high)', 'H(high)', and 'H(high)', respectively, the control signal generator 57 may determine the second attenuation value AV2 or the third attenuation value AV3 to be 0 dB.

When bit values of the first comparison signal COMP1 are 'L(low)', 'H(high)', 'H(high)', and 'H(high)', respectively, the control signal generator 57 may determine the first attenuation value AV1 to be 10 dB. Similarly, when bit values of the second comparison signal COMP2 or the third comparison signal COMP3 are 'L(low)', 'H(high)', 'H(high)', and 'H(high)', respectively, the control signal generator 57 may determine the second attenuation value AV2 or the third attenuation value AV3 to be 10 dB.

When bit values of the first comparison signal COMP1 are 'L(low)', 'L(low)', 'H(high)', and 'H(high)', respectively, the control signal generator 57 may determine the first attenuation value AV1 to be 20 dB. Similarly, when bit values of the second comparison signal COMP2 or the third comparison signal COMP3 are 'L(low)', 'L(low)', 'H(high)', and 'H(high)', respectively, the control signal generator 57 may determine the second attenuation value AV2 or the third attenuation value AV3 to be 20 dB.

When bit values of the first comparison signal COMP1 are 'L(low)', 'L(low)', 'L(low)', and 'H(high)', respectively, the control signal generator 57 may determine the first attenuation value AV1 to be 32 dB. Similarly, when bit values of the second comparison signal COMP2 or the third comparison signal COMP3 are 'L(low)', 'L(low)', 'L(low)', and 'H(high)', respectively, the control signal generator 57 may determine the second attenuation value AV2 or the third attenuation value AV3 to be 32 dB.

When bit values of the first comparison signal COMP1 are 'L(low)', 'L(low)', 'L(low)', and 'L(low)', respectively, the control signal generator 57 may determine the first attenuation value AV1 to be 36 dB. Similarly, when bit values of the second comparison signal COMP2 or the third comparison signal COMP3 are 'L(low)', 'L(low)', 'L(low)', and 'L(low)', respectively, the control signal generator 57 may determine the second attenuation value AV2 or the third attenuation value AV3 to be 36 dB.

The control signal generator 57 generates a digital control signal DC and the second control signal CS2 based on the first to third attenuation values AV1 to AV3. For example, the control signal generator 57 determines the largest value of the first to third attenuation values AV1 to AV3 as a final attenuation value, and generates the digital control signal DC and the second control signal CS2 according to the final attenuation value.

For example, when the first attenuation value AV1 is 0 dB, the second attenuation value AV2 is 10 dB, and the third attenuation value AV3 is 36 dB, the control signal generator 57 determines the third attenuation value of 36 dB as a final attenuation value and generates the digital control signal DC and the second control signal CS2 according to the final attenuation value.

Even if the first attenuation value AV1 determined by the average power calculator 51 is 0 dB, when the second attenuation value AV2 or the third attenuation value AV3 determined by the first peak power calculator 53 or the second peak power calculator 55 is 0 dB or more (for example, 10 dB or 36 dB), attenuation of the analog signal AS_I and the digital signal DS_I may be required by the analog attenuator 20 or the digital attenuator 40. That is, when attenuation is determined only by the first attenuation value AV1, excessive power of the analog signal AS_I due to peak power may not be prevented. However, the repeater 100 according to an example embodiment of the inventive concept may effectively prevent excessive power of the analog signal AS_I input to the repeater 100 by excluding the possibility.

Meanwhile, when the first to third attenuation values AV1 to AV3 are equal, the control signal generator 57 determines the first attenuation value AV1 as a final attenuation value.

The determined final attenuation value may range from 0 dB to 36 dB.

When the determined final attenuation value is 0 dB, the control signal generator 57 may determine attenuation values of the analog signal AS_I and the attenuated digital signal DS_I to be 0 dB and 0 dB, respectively. The control signal generator 57 may generate the digital control signal DC and the second control signal CS2 each having a bit value '00' according to the respective determined attenuation values of the analog signal AS_I and the attenuated digital signal DS_I.

When the determined final attenuation value is 10 dB, the control signal generator 57 may determine attenuation values of the analog signal AS_I and the attenuated digital signal DS_I to be 8 dB and 2 dB, respectively. The control signal generator 57 may generate the digital control signal DC having a bit value '01' and the second control signal CS2 having a bit value '10' according to the respective determined attenuation values of the analog signal AS_I and the attenuated digital signal DS_I.

When the determined final attenuation value is 20 dB, the control signal generator 57 may determine attenuation values of the analog signal AS_I and the attenuated digital signal DS_I to be 16 dB and 4 dB, respectively. The control signal generator 57 may generate the digital control signal DC having a bit value '10' and the second control signal CS2 having a bit value '11' according to the respective determined attenuation values of the analog signal AS_I and the attenuated digital signal DS_I.

When the determined final attenuation value is 32 dB, the control signal generator 57 may determine attenuation values of the analog signal AS_I and the attenuated digital signal DS_I to be 32 dB and 0 dB, respectively. The control signal generator 57 may generate the digital control signal DC having a bit value '11' and the second control signal CS2 having a bit value '00' according to the respective determined attenuation values of the analog signal AS_I and the attenuated digital signal DS_I.

When the determined final attenuation value is 36 dB, the control signal generator 57 may determine attenuation values of the analog signal AS_I and the attenuated digital signal DS_I to be 32 dB and 4 dB, respectively. The control signal generator 57 may generate the digital control signal DC having a bit value '11' and the second control signal CS2 having a bit value '11' according to the respective determined attenuation values of the analog signal AS_I and the attenuated digital signal DS_I.

The DAC 58 may convert the digital control signal DC into the first control signal CS1. The first control signal CS1 may be a plurality of analog voltages.

For example, when a bit value of the digital control signal DC is '00', the DAC 58 converts the bit value of the digital control signal DC into analog voltages having 0V, 0V, and 0V, respectively.

When a bit value of the digital control signal DC is '01', the DAC 58 converts the bit value of the digital control signal DC into analog voltages having 5V, 0V, and 0V, respectively.

When a bit value of the digital control signal DC is '10', the DAC 58 converts the bit value of the digital control signal DC into analog voltages having 0V, 5V, and 0V, respectively.

When a bit value of the digital control signal DC is '11', the DAC 58 converts the bit value of the digital control signal DC into analog voltages having 0V, 0V, and 5V, respectively.

Referring again to FIG. 2, the DSP 60 receives the attenuated digital signal DS_O output from the digital attenuator 40. The DSP 60 executes instructions for performing various operations required for digital signal processing for the attenuated digital signal DS_O. The various operations may refer to operations such as calculating, filtering, or compressing a signal.

A DAC 70 converts a digital signal processed by the DSP 60 into an analog signal.

An AFE 80 processes the analog signal using a component such as a power amplifier (PA). The second antenna AT2 transmits the analog signal processed by the AFE 80.

Figure 5:
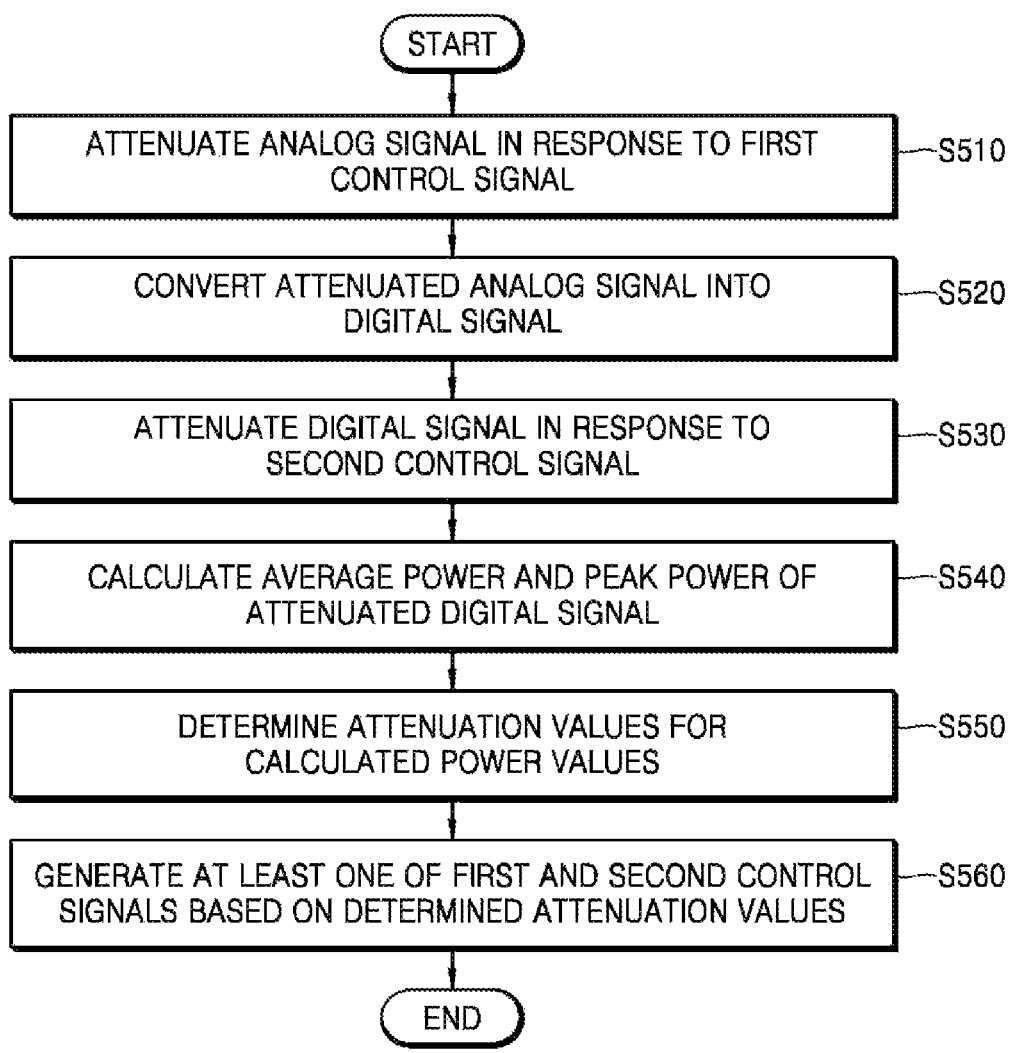
FIG. 5 is a flowchart of a method of attenuating signals of the repeater shown in FIG. 2.

FIG. 5 is a flowchart of a method of attenuating signals of the repeater 100 shown in FIG. 2. In some example embodiments, it should be noted that each of operations shown in FIG. 5 may be performed out of the order shown. For example, successive operations may be performed substantially concurrently or in a reverse order.

Referring to FIGS. 1 through 5, in operation S510, the analog attenuator 20 attenuates the analog signal AS_I in response to the first control signal CS1. The analog signal AS_I may be approximately attenuated by the analog attenuator 20.

In operation S520, the ADC 30 converts the attenuated analog signal AS_O into the digital signal DS_I.

In operation S530, the digital attenuator 40 attenuates the digital signal DS_I in response to the second control signal CS2. The digital attenuator 40 may precisely attenuate the digital signal DS_I. The attenuation value attenuable by the analog attenuator 40 may be less than the attenuation value attenuable by the digital attenuator 20. For example, the attenuation value attenuable by the digital attenuator 40 may be 1 dB, 2 dB, or 4 dB, and the attenuation value attenuable by the analog attenuator 20 may be 8 dB, 16 dB, or 32 dB.

In operation S540, the attenuation controller 50 calculates the average power and the peak power of the attenuated digital signal DS_O. The attenuation controller 50 may calculate the average power in a time domain of the attenuated digital signal DS_O and may calculate peak power in a time domain and/or a frequency domain of the attenuated digital signal DS_O.

In operation S550, the attenuation controller 50 determines attenuation values for the calculated power values. For example, the attenuation controller 50 compares the calculated average power value AP_S with at least one of the first plurality of threshold values TH1, TH2, TH3, and TH4 and determines the first attenuation value AV1 of the attenuated digital signal DS_O according to the comparison result. The attenuation controller 50 calculates peak power in a time domain of the attenuated digital signal DS_O, compares the calculated peak power value PP_T with at least one of the second plurality of threshold values TH5, TH6, TH7, and TH8, and determines the second attenuation value AV2 of the attenuated digital signal DS_O according to the comparison result. The attenuation controller 50 converts the attenuated digital signal into a frequency domain to calculate peak power in the frequency domain, compares the calculated peak power value PP_F with at least one of the third plurality of threshold values TH9, TH10, TH11, and TH12, and determines the third attenuation value AV3 of the attenuated digital signal DS_O according to the comparison result.

In operation S560, the attenuation controller 50 generates at least one of the first and second control signals CS1 and CS2 based on the determined attenuation values.

For example, the attenuation controller 50 generates at least one of the first and second control signals CS1 and CS2 according to the largest value of the first to third attenuation values AV1 to AV3.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope of the disclosure as defined by the following claims.

What is claimed is:

1. Attenuation device comprising:
   at least one attenuator configured to attenuate a signal in response to a control signal; and
   an attenuation controller configured to calculate average power and peak power of the attenuated signal, determine a first attenuation value for the calculated average power and a second attenuation value for the calculated peak power, compare magnitudes of the first attenuation value and the second attenuation value, and generate the control signal according to a larger value between the first attenuation value and the second attenuation value.

2. The attenuation device of claim 1, wherein
   the attenuation controller is configured to calculate the average power of the attenuated signal by a root means square (RMS) value.

3. The attenuation device of claim 1, wherein
   the attenuation controller is configured to calculate the peak power of the attenuated signal in at least one of a time domain and a frequency domain.

4. The attenuation device of claim 1, wherein
   the attenuation controller is configured to compare each of the average power and the peak power with at least one corresponding threshold value, and determine the first attenuation value and the second attenuation value for each of the average power and the peak power according to a result of comparing the magnitudes.

5. The attenuation device of claim 1, wherein
   the attenuation controller is configured to compare magnitudes of the determined first and second attenuation values and generate the control signal according to the first attenuation value for the average power if the determined first and second attenuation values are substantially equal in magnitude.

6. The attenuation device of claim 1, wherein
   the attenuation controller comprises:
   an average power calculator configured to calculate the average power of the attenuated signal;
   a first peak power calculator configured to calculate peak power in a time domain of the attenuated signal;
   a second peak power calculator configured to calculate peak power in a frequency domain of the attenuated signal;
   a first comparator configured to compare a value of the calculated average power with at least one of first threshold values to output a first comparison signal;
   a second comparator configured to compare a value of the calculated peak power in the time domain with at least one of second threshold values to output a second comparison signal;
   a third comparator configured to compare a value of the calculated peak power in the frequency domain with at least one of third threshold values to output a third comparison signal; and
   a control signal generator configured to determine the first, a third and a fourth attenuation values, each respectively corresponding to the first to third comparison signals, and generate the control signal based on the first, third and fourth attenuation values, wherein the second attenuation value corresponds to one of the third and fourth attenuation values.

7. An attenuation device, comprising:
   at least one attenuator configured to attenuate a signal in response to a control signal; and
   an attenuation controller configured to calculate power of the attenuated signal in a time domain and a frequency domain, determine an attenuation value for each value of the power calculated in the time domain and the frequency domain, and generate the control signal based on the determined attenuation values.

8. The attenuation device of claim 7, wherein
   the attenuation controller is configured to calculate the power of the attenuated signal in the time domain by a root means square (RMS) value and a peak value.

9. The attenuation device of claim 7, wherein
   the attenuation controller is configured to calculate the power of the attenuated signal in the frequency domain by a peak value.

10. A method of controlling an attenuation device, comprising:
    attenuating a signal in response to a control signal;
    calculating average power and peak power of the attenuated signal;
    determining a first attenuation value for the calculated average power and a second attenuation value for the calculated peak power;
    comparing magnitudes of the first attenuation value and the second attenuation value; and
    generating the control signal according to a larger value between the first attenuation value and the second attenuation value.

11. The method of claim 10, wherein the calculating average power and peak power comprises:
    calculating the average power of the attenuated signal by a root means square (RMS) value.

12. The method of claim 10, wherein the calculating peak power and peak power comprises:
    calculating the peak power of the attenuated signal in at least one of a time domain and a frequency domain.

13. The method of claim 10,
    wherein the determining the first attenuation value and the second attenuation value comprises:
    comparing each of the average power and the peak power with at least one corresponding threshold value; and
    determining the first attenuation value and the second attenuation value for each of the average power and the peak power according to a result of comparing the magnitudes.

14. A method of controlling an attenuation device, comprising:
    attenuating a signal in response to a control signal;
    calculating power of the attenuated signal in a time domain and a frequency domain;
    determining an attenuation value for each value of the power calculated in the time domain and the frequency domain; and
    generating the control signals based on the determined attenuation values.

15. The method of claim 14, wherein the calculating power comprises:
    calculating the power of the attenuated signal in the time domain by a root means square (RMS) value and a peak value.

16. The method of claim 14, wherein the calculating power comprises:
calculating the power of the attenuated signal in the frequency domain by a peak value.

* * * * *